J. J. HOOKS.
ATTACHMENT FOR SEED PLANTERS.
APPLICATION FILED JULY 23, 1913.
1,102,924.
Patented July 7, 1914.
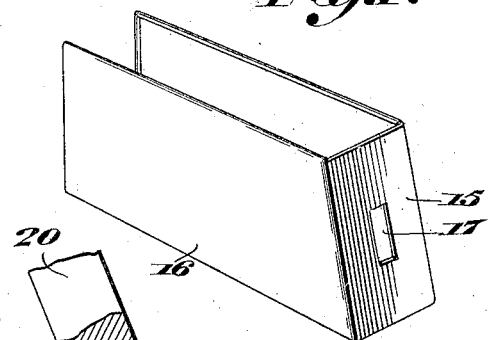
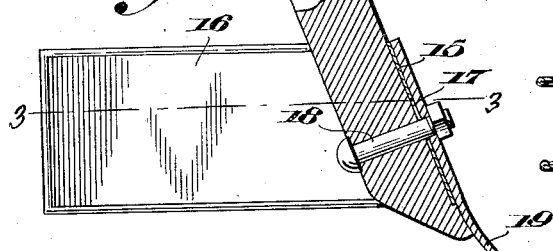
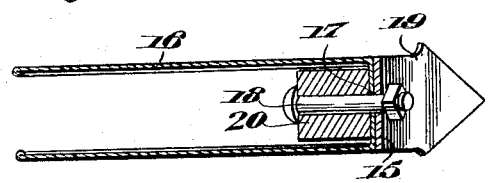
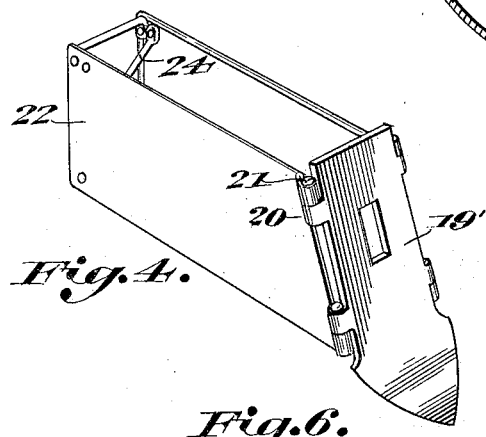
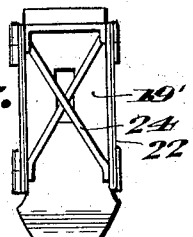
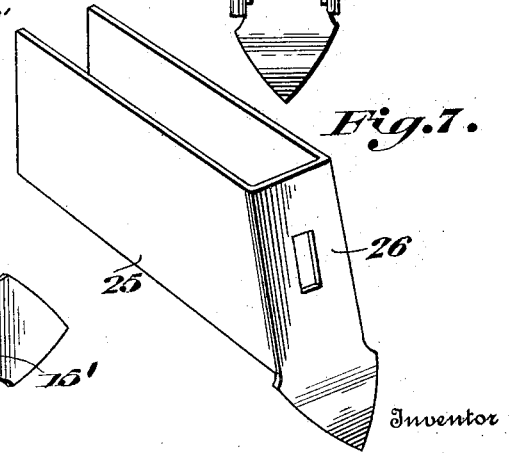
Inventor
Jesse J. Hooks
Witnesses
By Victor J. Evans
Attorney

UNITED STATES PATENT OFFICE.

JESSE J. HOOKS, OF RUN, TEXAS.

ATTACHMENT FOR SEED-PLANTERS.

1,102,924. Specification of Letters Patent. Patented July 7, 1914.

Application filed July 23, 1913. Serial No. 780,739.

*To all whom it may concern:*

Be it known that I, JESSE J. HOOKS, a citizen of the United States, residing at Run, in the county of Hidalgo and State of Texas, have invented new and useful Improvements in Attachments for Seed-Planters, of which the following is a specification.

This invention relates to an attachment for seed planters.

In planting various seeds, such as cotton, corn, peas and the like with machines of certain types, the seed is dropped or deposited in a furrow which is opened in advance of the seed spout by a blade provided for the purpose. It frequently happens that lumps or clods will drop, or dirt will sift back into the furrow before the seed reaches the same, thereby causing the seed to be unevenly planted, and causing a variation in the growth which is not conducive to the best results.

The prime object of the present invention is to produce a simple device which may be in the nature of an attachment to the furrow opening blade, whereby the walls of the furrow will be guarded until the seed has been deposited in the bottom of the furrow.

A further object of the invention is to simplify and improve the construction and the arrangement of the improved device or attachment.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a perspective view showing a simple and preferred form of the improved device or attachment. Fig. 2 is a longitudinal vertical sectional view showing the same applied to a furrow opener. Fig. 3 is a horizontal sectional view taken on the line 3—3 in Fig. 2. Fig. 4 is a perspective view showing the wings or shields connected hingedly with a furrow opener. Fig. 5 is a rear view of the device as shown in Fig. 4 to illustrate particularly the rear braces. Fig. 6 is a horizontal sectional view showing a modified form of a protecting device equipped with hinged wings or shields applied to a furrow opener. Fig. 7 is a perspective view showing the wings or shields integral with a furrow opener.

Corresponding parts in the several figures are denoted by like characters of reference.

The improved device in its most simple form consists of a plate of sheet metal which is cut and bent to form an inclined face plate 15 and rearwardly extending wings or shields 16, said shields having parallel upper and lower edges disposed in substantially horizontal planes, and said shields being disposed in substantially parallel relation to one another. The inclined base plate is provided with a slot 17 for the passage of a bolt 18, whereby a furrow opening blade, such as an ordinary bull tongue 19 is mounted on a standard 20, the face plate 15 being interposed between the blade 19 and the standard, and the shields extending rearwardly at either side of said standard. The side faces of the standard are flat and substantially parallel to each other, and the width of the standard is about equal to the width of the face plate so that the means 16 will be spaced apart at their forward ends by said standard and will thus be prevented from collapsing. When the furrow opener is utilized for the purpose of opening a furrow for the reception of seed, the wings or shields 16 will protect the walls of the furrow and prevent them from caving or as well as to prevent dirt or clods from dropping into the bottom of the furrow previous to the dropping of the seed, as will be readily understood. It has not been considered necessary to illustrate a seed spout, as the construction and operation thereof is well understood.

In Fig. 4 a modified form of the invention has been shown, under which the blade of a furrow opener, here designated by 19', is provided at the side edges thereof with ears or lugs 20 for the reception of pintles 21 upon which the shields or wings 22 are hingedly supported, said wings or shields being provided with hinge lugs 23. When this construction is resorted to, it may be desirable to connect the rear ends of the wings or shields 22 by means of inclined braces 24 for the purpose of holding them properly spaced.

In Fig. 6 a construction somewhat similar to that illustrated in Figs. 4 and 5 has been shown, with the exception that the wings or shields, here designated by 22', are hingedly connected with a face plate 15' to be mounted in rear of a furrow opening blade in substantially the manner illustrated in Figs. 2 and 3. In Fig. 7 a further modification has been illustrated which consists in forming the shields or wings, here designated by 25, integral with the furrow opening blade which is here designated by 26.

Other changes and modifications than those herein specifically described and illustrated will readily suggest themselves to the skilled mechanic and need not be further described in detail.

It will be readily seen that by the several forms of the invention means have been provided, whereby the walls of the furrow formed by the furrow opener will be prevented from moving and clods and dirt will be prevented from dropping therein until the seed has been deposited in the bottom of the furrow, it being evident that the wings are to be made sufficiently long to serve the desired purpose.

Having thus described the invention, what is claimed as new is:—

1. The combination with a standard having flat substantially parallel side faces and an inclined front face, of a bolt extending through said standard, a furrow opener mounted on the bolt, a plate mounted on the bolt between the standard and the furrow opener and having a bolt engaging slot to permit vertical adjustment, and wings extending rearwardly from said plate, said wings engaging the side faces of the standard and spaced apart thereby.

2. The combination with a standard having flat substantially parallel side faces, of a plate engaging the front face of the standard, wings hingedly connected with the plate and extending rearwardly adjacent to the side faces of the standard being thereby spaced apart, and means for connecting together the rearward ends of the wings.

In testimony whereof I affix my signature in presence of two witnesses.

JESSE J. HOOKS.

Witnesses:
  T. J. Hooks,
  T. B. Hooks.

---

Copies of this patent may be obtained for five cents each, by addressing the "Commissioner of Patents, Washington, D. C."